March 4, 1924.
H. W. MELLING
NUT MAKING MACHINE
Filed Sept. 27, 1922   2 Sheets-Sheet 1
1,485,689
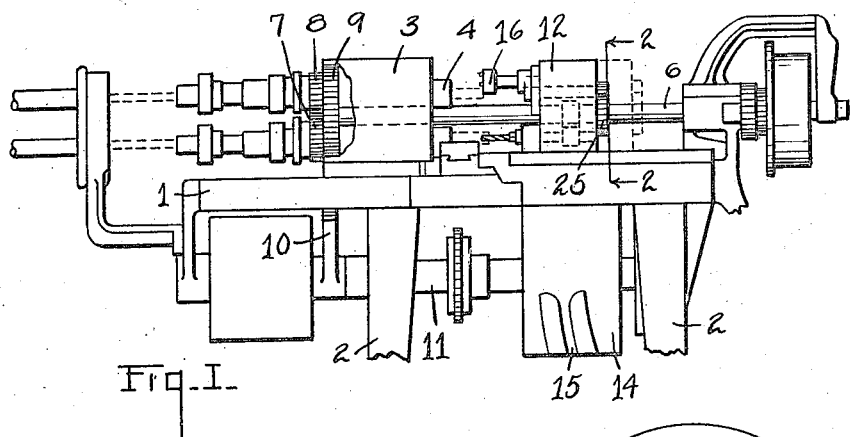
Fig. I.
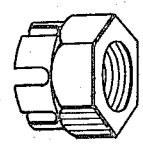
Fig. VIII.
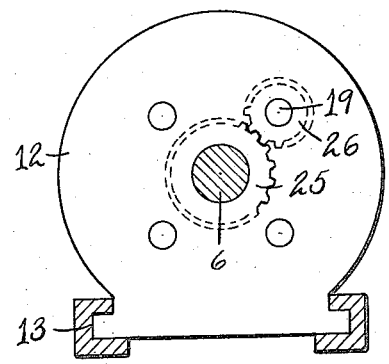
Fig. II.
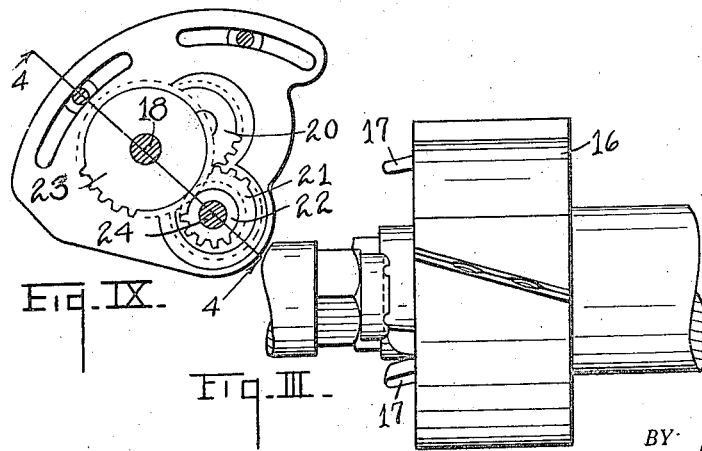
Fig. IX.
Fig. III.
INVENTOR.
Herman W. Melling
BY Chappell Earl
ATTORNEYS March 4, 1924.    1,485,689
H. W. MELLING
NUT MAKING MACHINE
Filed Sept. 27, 1922    2 Sheets-Sheet 2
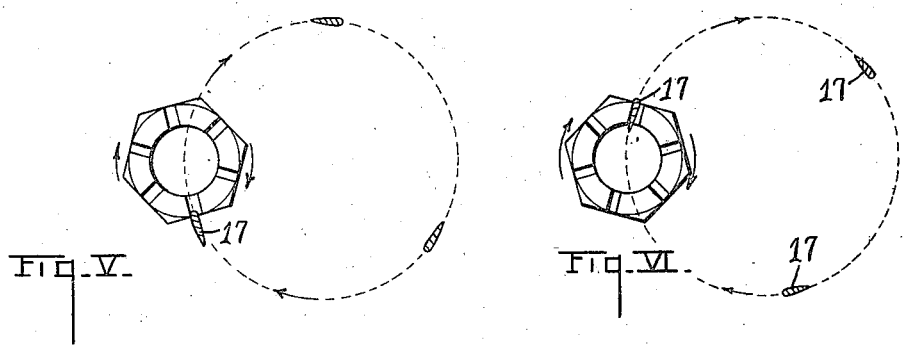
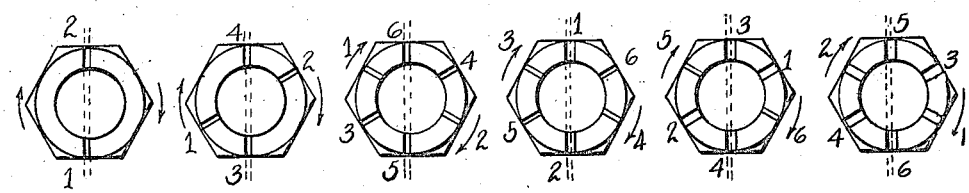
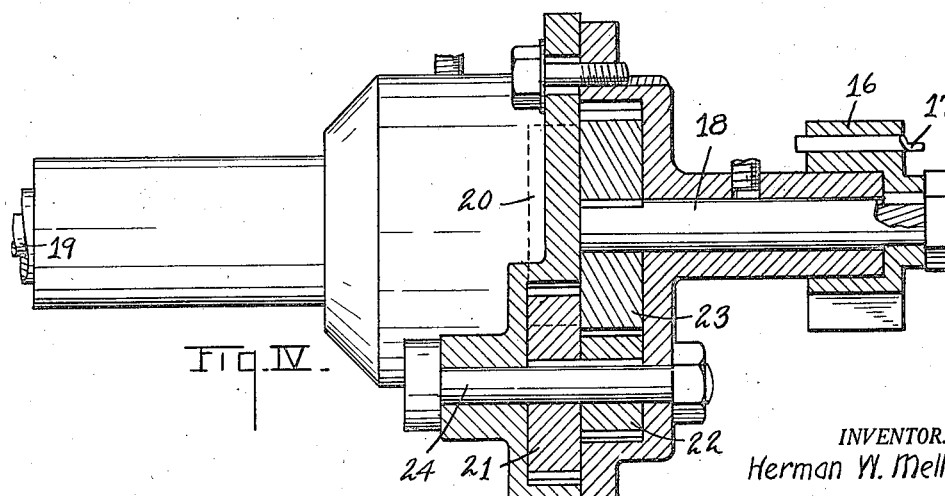
INVENTOR.
Herman W. Melling
BY Chappell&Earl
ATTORNEYS Patented Mar. 4, 1924.

1,485,689

UNITED STATES PATENT OFFICE.

HERMAN W. MELLING, OF JACKSON, MICHIGAN.

NUT-MAKING MACHINE.

Application filed September 27, 1922. Serial No. 590,830.

*To all whom it may concern:*

Be it known that I, HERMAN W. MELLING, a citizen of the United States, residing at Jackson, county of Jackson, State of Michigan, have invented certain new and useful Improvements in Nut-Making Machines, of which the following is a specification.

This invention relates to improvements in nut making machines.

The main object of this invention is to provide an improved machine for the manufacture of castellated nuts.

A further object is to provide an improved machine for the manufacture of castellated nuts in which the slots are formed by cutters as a step in connection with other steps in an automatic machine for the manufacture of castellated nuts.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a fragmentary front elevation of a machine embodying the features of my invention.

Fig. II is a detail section on a line corresponding to line 2—2 of Fig. I.

Fig. III is an enlarged detail side elevation showing the relation of the cutter to the work.

Fig. IV is a detail view of the cutter partially in section, the cutter being removed from the carriage.

Fig. V is an end view of the work, the cutter blades being shown in diagonal relation thereto.

Fig. VI is a view similar to Fig. V showing the cutter in another position.

Fig. VII is a view illustrating six succeeding operations or cuts on the work.

Fig. VIII is a perspective view of a completed nut.

Fig. IX is a detail section showing the arrangement of the spindle driving gears.

In the drawing the sectional views are taken looking in the direction of the little arrows at the ends of the section lines and similar numerals of reference refer to similar parts throughout the several views.

Referring to the drawing, 1 represents the bed of the machine and 2 the legs or pedestals. The work turret 3 is provided with a plurality of work holders 4, these work holders having driving connections to the main driving shaft 6 consisting of the gears 7 and 8. The means for advancing the turret with a step by step movement consists of the gear 9 and the coacting segment 10 on the shaft 11. The details of these parts are not illustrated as they form no part of this invention.

The work carriage 12 is mounted in the ways 13 and driven from the rotatable drum 14 having cam groove 15 therein. The cutters 16 are provided with blades 17 projecting at the ends thereof. The cutter is mounted upon the spindle 18 and is driven through the spindle driving shaft 19 connected to the shaft 6 by the gears 25 and 26. The carriage in the structure illustrated is provided with a plurality of tools in addition to the cutter; that is, it is provided with tools for operating on the work at each step or position of the turret, but as the details of these other tools form no part of this invention they are not illustrated herein.

The spindle 18 is connected to the shaft 19 by means of the gears 20, 21, 22 and 23, the gear 23 being secured to the cutter spindle and the gear 20 being secured to the shaft 19. The gear 21 is mounted on the stub shaft 24 to coact with the gear 20 while the gear 22 is connected to the gear 21 and meshes with the gear 23. The gears 20 and 21 are eccentric gears thus securing a variable speed drive for the cutter. The work and cutter are connected through the shaft 6 as described, the gears being proportioned so that the cutter and work are driven in a two to one ratio. The result of this is that when the tool carriage is advanced, the cutters are brought into operative relation to the work as indicated in Figs. V and VI, the first cut being the cut designated as 1, Fig. VII, the second being that designated as 2, the position of the work when the cuts are formed being shown by the dotted circle indicating the path of the cutters in Fig. V. As the work is rotated the third and fourth cuts are taken successively, the work having then completed a half revolution. It will be observed that the cutter will then enter at the opposite sides from what it did in forming the first cuts, the cuts thus alternating as the work proceeds.

By providing the eccentric gears the speed of the cutter is increased during the cutting period so that a substantialy straight cut is made. If this variable speed feature were not present the cut would be in the form of an arc. The feed of the tool carriage may be considerably varied, this being largely a matter within the judgment of the operator. I have described above a complete series of cuts, the series of steps illustrated and described constituting one complete revolution of the work and two revolutions of the cutter. This, of course, is repeated until the slots are cut to the desired depth.

I have illustrated and described my improvements as I have embodied the same in a machine for the manufacture of castellated nuts. I have not attempted to illustrate or describe certain other adaptations which I contemplate as I believe the disclosure made will enable those skilled in the art to which my invention relates to embody or adapt the same as may be desired.

Having thus described my invention what I claim as new and desire to secure by Letters Patent is:

1. In a structure of the class described, the combination with a work spindle, of a cutter spindle, a cutter on said cutter spindle provided with end blades, a spindle driving shaft, a train of gears connecting said spindle driving shaft and cutter spindle comprising coacting eccentric gears whereby said cutter spindle is driven with variable speed, and driving connections for said spindle driving shaft and work spindle whereby the cutter and work are driven at a ratio presenting the work to the cutter blades in alternating positions as the succeeding cuts are taken at a given point of the work and the work is acted upon by the blades during the periods of increased speed of the cutter.

2. In a structure of the class described, the combination with a work spindle, of a cutter spindle, a cutter on said said cutter spindle provided with end blades, a spindle driving shaft, a train of gears connecting said spindle driving shaft and cutter spindle comprising coacting eccentric gears whereby said cutter spindle is driven with variable speed, and driving connections for said spindle driving shaft and work spindle.

3. In a structure of the class described, the combination with a work spindle, of a cutter, a train of driving gears for said cutter comprising coacting eccentric gears whereby said cutter is driven with variable speed, and driving connections for said cutter and work spindle whereby the cutter and work are driven at a ratio presenting the work to the cutter blades in alternating positions as the succeeding cuts are taken at a point of the work, and the work is acted upon by the blades during the periods of increased speed of the cutter.

4. In a structure of the class described, the combination with a work spindle, of a cutter provided with end blades, a train of driving gears for said cutter comprising coacting eccentric gears whereby said cutter is driven with variable speed, and driving connections for said cutter and work spindle.

5. In a structure of the class described, the combination with a work spindle, of a cutter, a driving means for said cutter whereby it is driven with variable speed, and driving connections for said cutter and work spindle whereby the cutter and work are driven at a ratio presenting the work to the cutter in alternate positions as the succeeding cuts are taken at a point of the work.

In witness whereof, I have hereunto set my hand and seal.

HERMAN W. MELLING. [L. S.]